United States Patent
Gathala et al.

(10) Patent No.: US 10,127,018 B2
(45) Date of Patent: Nov. 13, 2018

(54) DYNAMIC ADDITION OF CODE IN SHARED LIBRARIES

(71) Applicant: QUALCOMM Incorporated, San Diego, CA (US)

(72) Inventors: Sudha Anil Kumar Gathala, Tracy, CA (US); Mihai Christodorescu, San Jose, CA (US); Mastooreh Salajegheh, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 58 days.

(21) Appl. No.: 15/085,415

(22) Filed: Mar. 30, 2016

(65) Prior Publication Data
US 2017/0286066 A1 Oct. 5, 2017

(51) Int. Cl.
| | |
|---|---|
| G06F 8/30 | (2018.01) |
| G06F 9/445 | (2018.01) |
| G06F 11/36 | (2006.01) |
| G06F 8/54 | (2018.01) |
| G06F 11/34 | (2006.01) |

(52) U.S. Cl.
CPC .......... *G06F 8/30* (2013.01); *G06F 8/54* (2013.01); *G06F 9/44521* (2013.01); *G06F 9/44557* (2013.01); *G06F 11/3624* (2013.01); *G06F 11/3644* (2013.01); *G06F 11/3466* (2013.01)

(58) Field of Classification Search
CPC .......... G06F 8/30; G06F 8/54; G06F 9/44521; G06F 9/44557; G06F 11/3624; G06F 11/3644; G06F 11/3466
See application file for complete search history.

(56) References Cited

U.S. PATENT DOCUMENTS

| | | | |
|---|---|---|---|
| 7,296,138 B1 * | 11/2007 | Conover | G06F 12/109 |
| | | | 711/203 |
| 9,110,737 B1 | 8/2015 | Tibble et al. | |
| 2005/0114633 A1 | 5/2005 | Palat et al. | |
| 2006/0190924 A1 * | 8/2006 | Bruening | G06F 12/0875 |
| | | | 717/104 |

(Continued)

FOREIGN PATENT DOCUMENTS

WO 2011116987 A1 9/2011

OTHER PUBLICATIONS

International Search Report and Written Opinion—PCT/US2017/019710—ISA/EPO—dated Jun. 2, 2017.

*Primary Examiner* — Viva Miller
(74) *Attorney, Agent, or Firm* — Jae-Hee Choi; The Marbury Law Group

(57) ABSTRACT

Various embodiments include methods for dynamically modifying shared libraries on a client computing device. Various embodiment methods may include receiving a first set of code segments and a first set of code sites associated with a first application. Each code in the first set of code sites may include an address within a compiled shared library stored on the client computing device. The compiled shared library may include one or more dummy instructions inserted at each code site in the first set of code sites, and each code segment in the first set of code segments may be associated with a code site in the first set of code sites. The client computing device may insert each code segment in the first set of code segments at its associated code site in the compiled shared library.

18 Claims, 14 Drawing Sheets

(56) References Cited

U.S. PATENT DOCUMENTS

| | | | |
|---|---|---|---|
| 2007/0005921 A1* | 1/2007 | Ganjoo | G06F 12/0246 |
| | | | 711/165 |
| 2009/0158264 A1 | 6/2009 | Burka et al. | |
| 2009/0249368 A1* | 10/2009 | Needamangala | G06F 8/67 |
| | | | 719/328 |
| 2010/0011361 A1* | 1/2010 | Millmore | G06F 21/6218 |
| | | | 718/100 |
| 2011/0173618 A1 | 7/2011 | Laborczfalvi et al. | |
| 2012/0204162 A1* | 8/2012 | Nikara | G06F 9/45516 |
| | | | 717/148 |
| 2013/0198527 A1* | 8/2013 | Lu | G06F 9/445 |
| | | | 713/189 |
| 2014/0229921 A1 | 8/2014 | Arora et al. | |

* cited by examiner

DYNAMIC ADDITION OF CODE IN SHARED LIBRARIES

BACKGROUND

Various computing devices, including desktop computers, laptops, tablets, and mobile computing devices such as smart phones, may store a number of shared libraries. A shared library may be a collection of functions, subroutines, classes, values, configuration data, templates, and/or other information that may be utilized by multiple applications executing on the computing device. A single copy of the shared library may be compiled and loaded into memory at run time, and multiple applications may simultaneously access the shared library.

In some instances, it may be advantageous for applications to be able to dynamically alter the code of a shared library during run time. For example, instrumentation code inserted into a shared library may allow an application to trace the number of times and the sequence that certain functions in the shared library are invoked by one or more applications. In another example, the addition of code in a shared library may make debugging easier. However, shared libraries are usually loaded and mapped into memory as read only, so applications are not able to independently and dynamically alter the code of a shared library.

SUMMARY

Various embodiments include methods implemented on a client computing device for dynamically modifying shared libraries. Various embodiments may include receiving a first set of code segments and a first set of code sites associated with a first application. Each code in the first set of code sites may include an address within a compiled shared library stored on the client computing device. The compiled shared library may include one or more dummy instructions (e.g., no-operation or NOP instructions) inserted at each code site in the first set of code sites, and each code segment in the first set of code segments may be associated with a code site in the first set of code sites. The methods may further include inserting each code segment in the first set of code segments at its associated code site in the compiled shared library.

Some embodiments may further include receiving a request to modify the compiled shared library from the first application, determining whether the first application is authorized to modify the compiled shared library, and denying the request to modify the compiled shared library in response to determining that the first application is not authorized to modify the compiled shared library.

In some embodiments, inserting each code segment at its associated code site in the compiled shared library may include copying an original memory page of the compiled shared library containing a first code site in the first set of code sites, overwriting the one or more dummy instructions at the first code site of the copied memory page with an associated code segment, and overwriting the original memory page with the copied memory page. In some embodiments, inserting each code segment at its associated code site in the compiled shared library may include copying an original memory page of the compiled shared library containing a first code site in the first set of code sites, overwriting the one or more dummy instructions at the first code site of the copied memory page with an associated code segment, un-mapping the original memory page from an address space of the compiled shared library associated with the first application, and mapping the copied memory page into the address space at a same address location as the original memory page. In some embodiments, inserting each code segment at its associated code site in the compiled shared library may include overwriting the one or more dummy instructions at a first code site in the first set of code sites in the compiled shared library with an associated code segment.

Some embodiments may further include receiving a second set of code segments and a second set of code sites associated with a second application. Each code site in the second set of code sites may include an address within the compiled shared library. The compiled shared library may include one or more dummy instructions inserted at each code site in the second set of code sites, and each code segment in the second set of code segments may be associated with a code site in the second set of code sites. The computing device may insert each code segment in the first set of code segments and the second set of code segments at its associated code site in the compiled shared library. Some embodiments may further include removing the first set of code segments inserted into the compiled shared library from memory when the compiled shared library is unloaded from memory.

Various embodiments include methods implemented on a computing device for compiling shared libraries. Such embodiments may include receiving a set of code sites, in which each code site in the set of code sites may include an address within a shared library stored on the computing device, and compiling the shared library, in which one or more dummy instructions (e.g., NOP instructions) are inserted in the compiled shared library at each code site in the set of code sites. Some embodiments may further include providing the compiled shared library to one or more client computing devices.

Further embodiments include a computing device including a memory and a processor configured with processor-executable instructions to perform operations of the methods summarized above. Further embodiments include a non-transitory processor-readable storage medium having stored thereon processor-executable software instructions configured to cause a processor of a computing device to perform operations of the methods summarized above. Further embodiments include a computing device that includes means for performing functions of the operations of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of the claims.

DETAILED DESCRIPTION

Figure 1A:
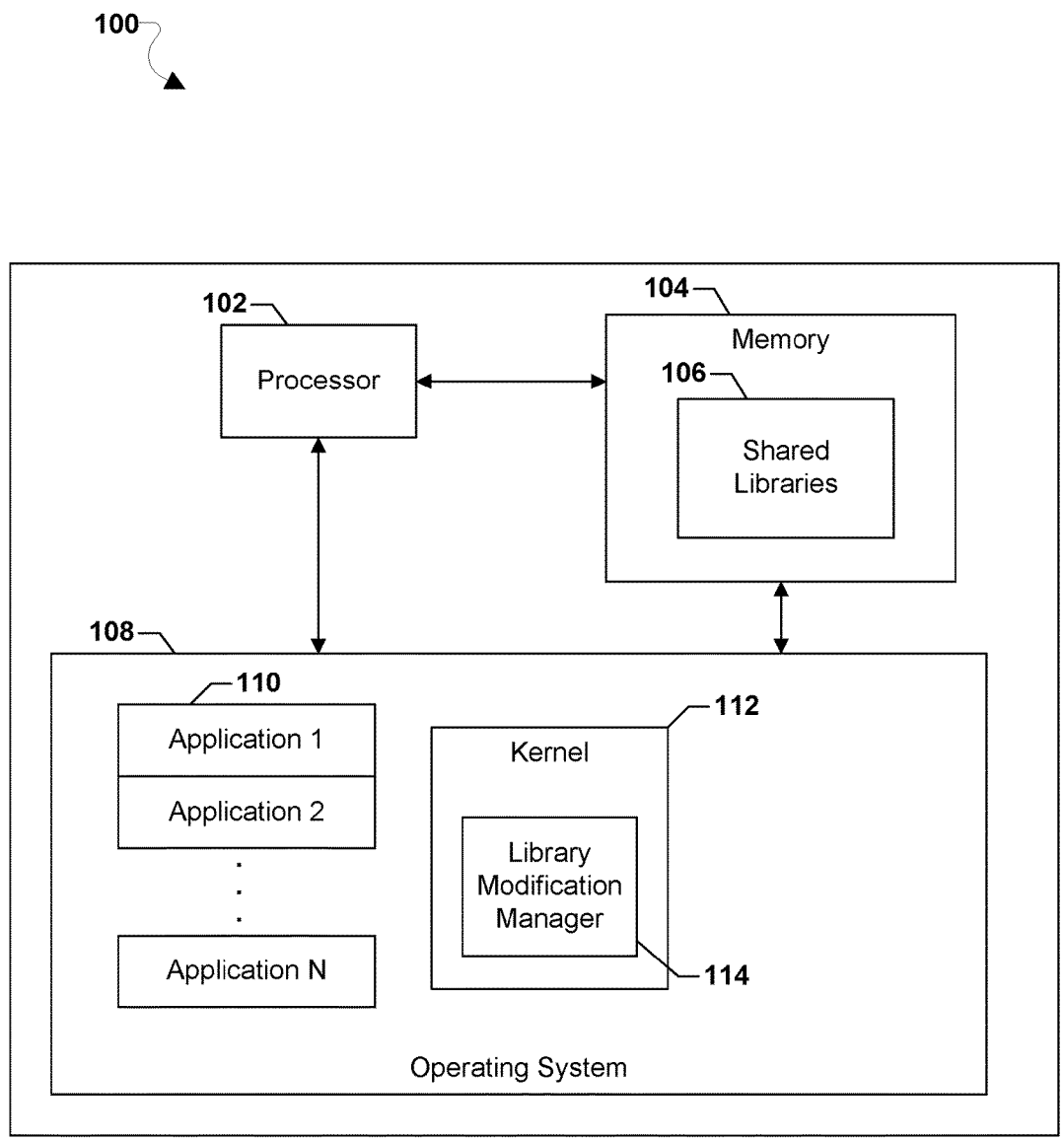
FIG. 1A is a block diagram of a client computing device suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the term "computing device" refers to any one or all of cellular telephones, smart phones, personal or mobile multi-media players, personal data assistants, desktop computers, laptop computers, tablet computers, servers, smart watches, smart books, palm-top computers, wireless electronic mail receivers, multimedia Internet-enabled cellular telephones, wireless gaming controllers, and similar personal or enterprise electronic devices that includes a programmable processor and memory.

Computing devices store a number of shared libraries that may be utilized by multiple applications simultaneously during run time. Generally, a single copy of a shared library may be compiled, loaded, and mapped into memory as read only, and each application accesses the loaded copy of the shared library. In other words, each application utilizes the same copy of the shared library.

In some cases it may be beneficial for applications to be able to dynamically insert code into a shared library during run time. For example, dynamic code insertion may allow applications to implement function tracing and collection of usage statistics, debugging, or pre- or post-processing tasks more easily. However, because only a single read only copy of a shared library exists during run time, an application cannot alter the shared library. Further, allowing one application to alter a shared library by overwriting code or moving code sections might interfere with the operations of other applications using the shared library.

In overview, various embodiments provide methods for dynamically modifying shared libraries on a computing device. Various embodiments may include a compiler on a library developer computing device receiving a set of code sites. Each code site in the set of code sites may include an address within a shared library stored on the computing device. When the shared library is compiled, one or more dummy instructions may be inserted in the compiled shared library at each of the set of code sites. A no-operation (NOP) instruction is one example of such dummy instructions. Other examples of dummy instructions include prefetching instructions and XOR against zero instructions. The term "dummy instruction" is used herein to refer to any form of code that will not be executed by a processor and thus may be included in a library to create room in memory storing the compiled shared library for a code site. Such dummy instructions may later be overwritten dynamically by applications to modify the shared library in a manner that does not interfere with the use of the shared library by other applications. The compiled shared library may be provided to a number of client computing devices.

On a client computing device, a method for dynamically modifying a shared library may begin when a library modification manager receives a first set of code sites and a first set of code segments associated with a first application. Each code site may include an address within a compiled shared library stored on the computing device at which one or more dummy instructions were inserted during compilation. Each code segment may be associated with a code site in the first set of code sites. The library modification manager may insert code segments at associated code sites in the compiled shared library when the compiled shared library is loaded into memory. Other applications may also have associated sets of code sites and code segments. The library modification manager may insert the proper code segments for each application at run time. In this manner, a shared library may be independently and dynamically modified by multiple applications at run time.

FIG. 1A is a block diagram of a client computing device 100 suitable for implementing various embodiments. The client computing device 100 may be, among other things, a desktop computer, laptop, tablet, any type of mobile electronic device, a server or any type of consumer or enterprise electronic device. The client computing device 100 includes a processor 102 for executing software instructions, and a memory 104 for storing code and data. The memory 104 may be a non-transitory computer-readable storage medium that stores processor-executable instructions. The memory 104 may store a number of compiled shared libraries 106. The compiled shared libraries 106 may be utilized by various applications 110 executing on the computing device 100.

The memory 104 may store an operating system 108, and various applications 110 may execute within the operating system 108. The operating system 108 may also include a kernel 112 that manages input and output requests from the applications 110 and translates the requests into data instructions to be processed by the processor 102. The kernel 112 may include a library modification manager 114 that is configured to allow applications to dynamically modify the shared libraries 106 during run time. The library modification manager 114 may be configured to insert code segments associated with the various applications 110 into specific code sites in the shared libraries 106 at run time. The operations performed by the library modification manager 114 are discussed in further detail with reference to FIGS. 2-11.

The client computing device 100 may also include various other components not illustrated in FIG. 1A. For example, the client computing device 100 may include a number of input, output, and processing components such as a speaker, microphone, modem, transceiver, subscriber identification module (SIM) card, keypad, mouse, display screen or touchscreen, various connection ports, audio or graphics processor, additional hard drives, and many other components known in the art.

Figure 1B:
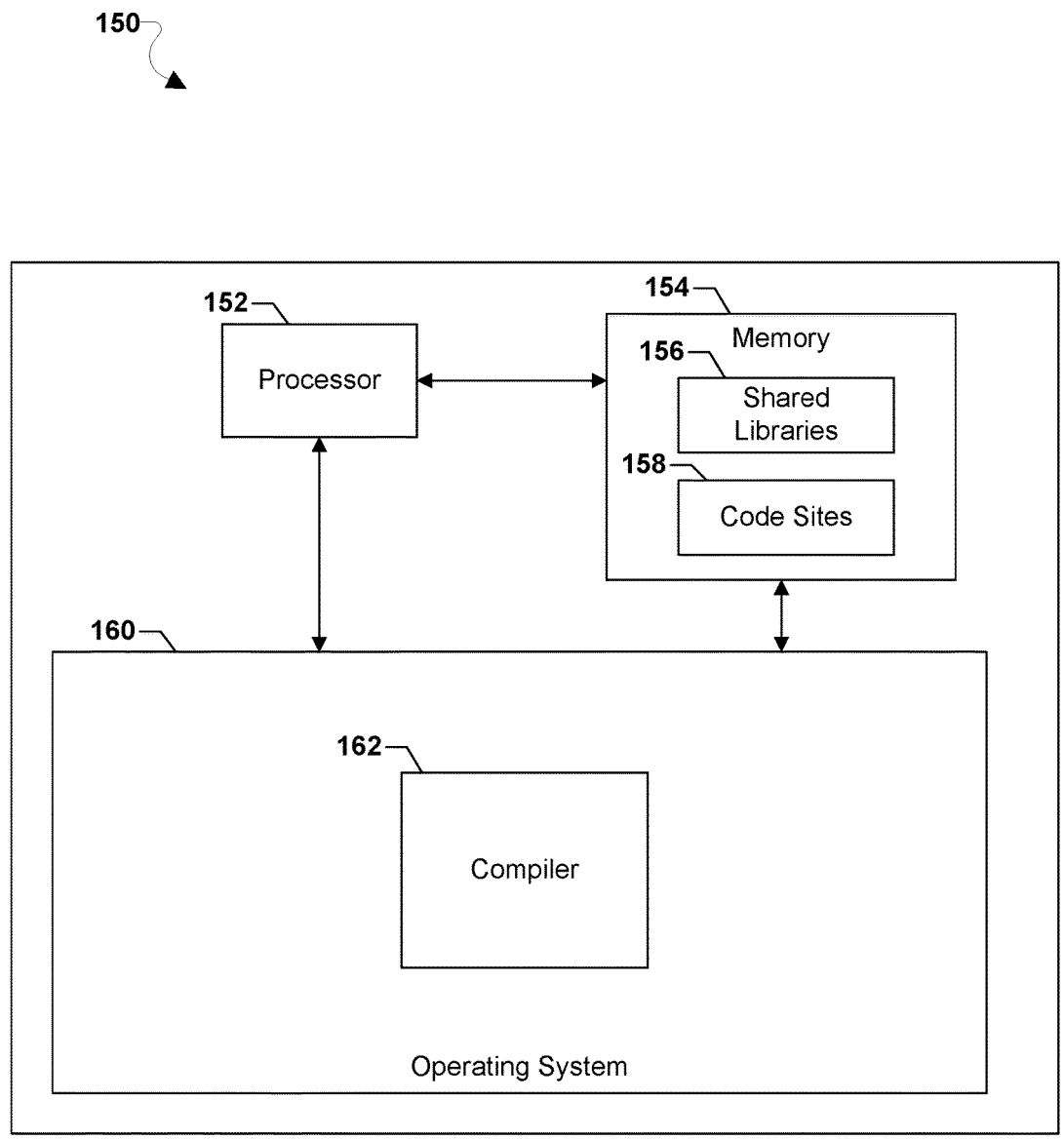
FIG. 1B is a block diagram of a library developer computing device suitable for use with various embodiments.

FIG. 1B is a block diagram of a library developer computing device 150 suitable for implementing various embodiments. The library developer computing device 150 may be, among other things, a desktop computer, laptop, tablet, any type of mobile electronic device, a server or any type of consumer or enterprise electronic device. The library developer computing device 150 may include a processor 152 for executing software instructions, and a memory 154 for storing code and data. The memory 154 may be a non-transitory computer-readable storage medium that stores processor-executable instructions. The memory 154 may store a number of shared libraries 156. The shared libraries may be utilized by various applications executing on client computing devices (e.g., the applications 110). The library developer computing device 150 may be utilized to create or receive the source code for the shared libraries 156, and compile them. The memory 154 may also store one or more sets of code sites 158. Each set of code sites 158 may be associated with a particular shared library 156. Each code site may include an address within the associated shared library at which dummy instructions (e.g., NOP instructions) may be inserted.

The memory 154 may store an operating system 160 and a compiler 162 that transforms source code into machine code. For example, the compiler 162 may compile the source code of the shared libraries 156 from source code to machine code. The compiler 162 may be configured to take as input one of the shared libraries 156 and the associated set of code sites 158, and insert one or more dummy instructions into the shared library at each code site during compilation. The compiled shared libraries may be provided to various client computing devices (e.g., the client computing device 100). The code sites in the compiled shared libraries may later be filled with code segments by the library modification manager 114 of the client computing device 100 when the compiled shared libraries are loaded during run time. The operations performed by the compiler 162 are discussed in further detail with reference to FIGS. 2-11.

The library developer computing device 150 may also include various other components not illustrated in FIG. 1B. For example, the library developer computing device 150 may include a number of input, output, and processing components such as a speaker, microphone, modem, transceiver, subscriber identification module (SIM) card, keypad, mouse, display screen or touchscreen, various connection ports, audio or graphics processor, additional hard drives, and many other components known in the art.

Figure 2:
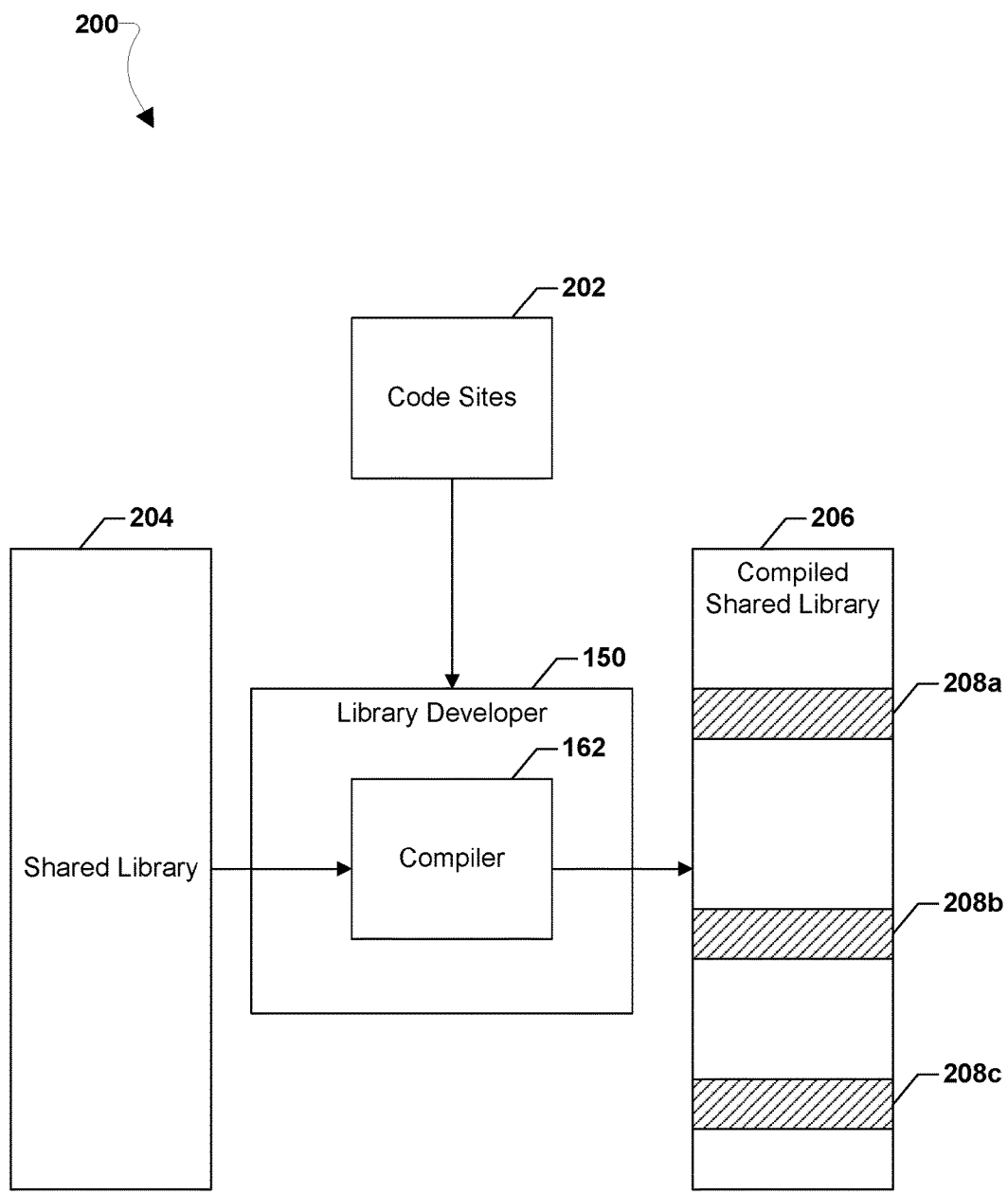
FIG. 2 is a block diagram illustrating the insertion of code sites into a shared library according to various embodiments.

FIG. 2 includes a block diagram 200 illustrating the insertion of code sites into a shared library by a computing device according to various embodiments. A library developer computing device (e.g., the library developer computing device 150) may store a set of code sites 202. Each code site in the set of code sites 202 may include a memory address within an associated shared library 204. The set of code sites 202 may indicate the memory locations in the shared library 204 where one or more applications may insert additional code segments. This allows the applications to independently and dynamically modify the shared library 204 during run time. The set of code sites 202 may be stored in memory (e.g., the memory 154) and may be associated with the shared library 204.

At the time when the shared library 204 is compiled, the compiler 162 of the library developer computing device 150 may take as input the set of code sites 202. The compiler 162 may be configured to insert one or more dummy instructions (e.g., NOP instructions) into the shared library 204 at each code site in the set of code sites 202 during compilation, creating a compiled shared library 206. The compiled shared library 206 may include one or more dummy instructions that are inserted at code sites 208a, 208b, and 208c. The dummy instructions create room in memory storing the compiled shared library 206 that may later be used to insert additional code segments by various applications. The number of dummy instructions inserted at each code site 208a, 208b, and 208c may be constant, and the number may be determined based on various parameters such as the number of code sites or the maximum size of code segments that may be inserted at the code sites. After compilation, the compiled shared library 206 may be provided (e.g., transmitted or downloaded) to one or more client computing devices.

Figure 3:
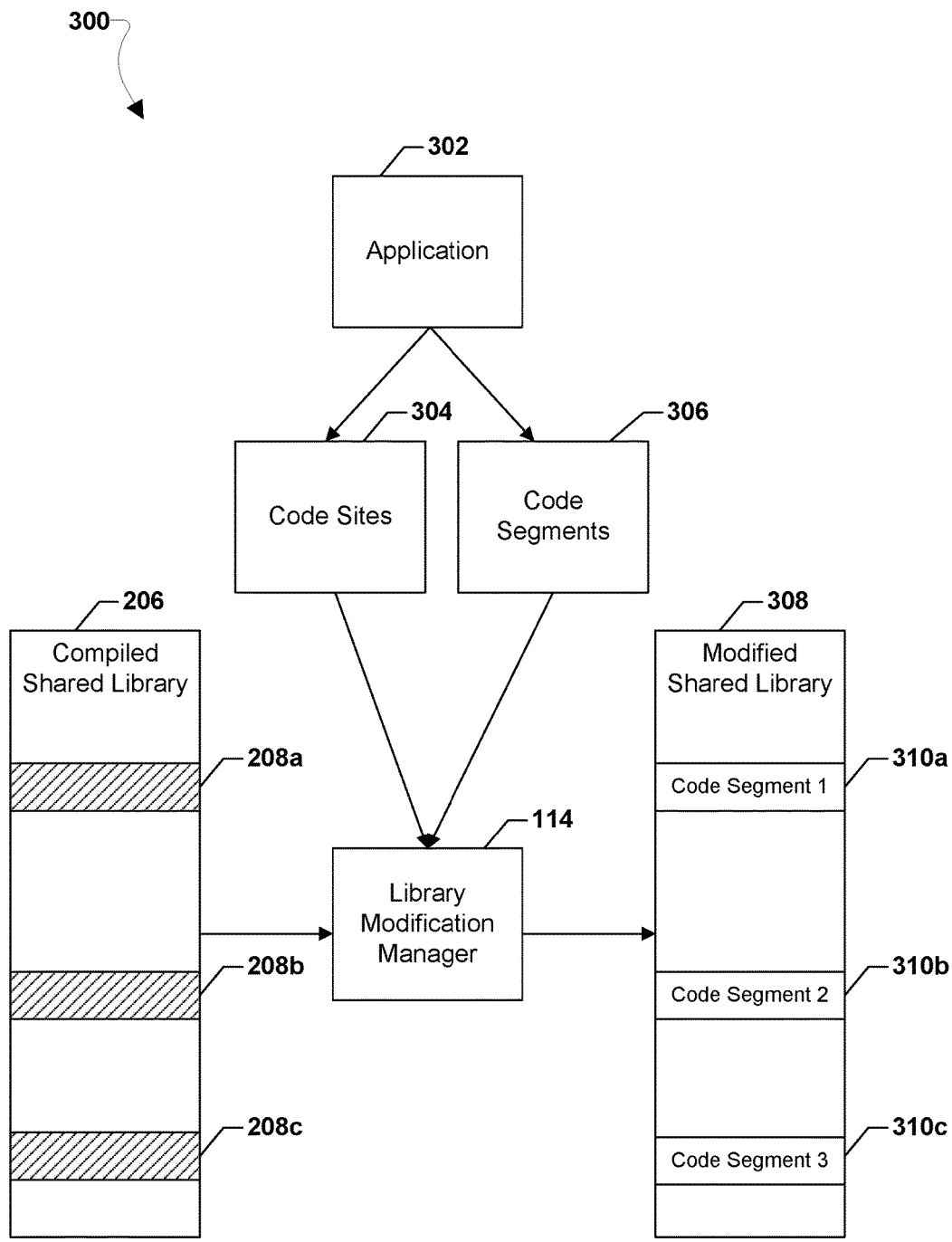
FIG. 3 is a block diagram illustrating dynamic insertion of code segments into a compiled shared library according to various embodiments.

FIG. 3 includes a block diagram 300 illustrating dynamic insertion of code segments at code sites in a shared library by a client computing device according to various embodiments. A client computing device (e.g., the client computing device 100) may receive the compiled shared library 206 from a library developer computing device (e.g., the library developer computing device 150). The client computing device may store an application 302. The application 302 may be associated with a set of code sites 304 and a set of code segments 306. Each code segment in the set of code segments 306 may be a segment of code to be inserted into a compiled shared library at a particular code site. Thus, each code segment in the set of code segments 306 may be associated with a code site in the set of code sites 304. The code sites may represent the memory locations in the compiled shared library 206 where the code segments should be inserted. The application 302 may be associated with separate sets of code segments for each shared library that the application 302 is authorized to dynamically modify. The application 302 may also be associated with separate sets of code segments for the same compiled shared library 206, with each set of code segments representing a different modification of the compiled shared library 206 (e.g., one set for debugging, another set for function tracing, etc.). The set of code segments 306 may be stored in memory (e.g., the memory 104) and may be associated with the application 302, the set of code sites 304, and the compiled shared library 206.

The library modification manager 114 of the client computing device may be configured to receive a request from the application 302 to register the set of code sites 304 and the associated set of code segments 306. For example, when the application 302 is loaded into memory and started up, the applications 302 may generate the request to the library modification manager 114. The library modification manager 114 may maintain an access control list that determines the privileges of various applications to insert code sites and code segments into a shared library. For example, the library modification manager 114 may first determine whether the application 302 is authorized to modify the compiled shared library 206, and may deny any such requests and not register the set of code sites 304 and the associated set of code segments 306 if the application 302 is not authorized to modify the shared library.

When the kernel of the client computing device loads the compiled shared library 206 into memory at run time of the application, the library modification manager 114 may replace the dummy instructions inserted into the compiled shared library 206 with code segments in the set of code segments 306. The library modification manager 114 may take as input the registered set of code sites 304 and the registered set of code segments 306 for the application 302, as well as code sites and code segments from other applications authorized to dynamically modify the compiled shared library 206. During loading of the compiled shared library 206, the library modification manager 114 may identify each code site 208a, 208b, 208c and overwrite the dummy instructions with corresponding code segments 310a, 310b, 310c. For example, the code segment 310a may be associated with the code site 208a. The library modification manager 114 may overwrite the dummy instructions inserted at the code site 208a with the code segment 310a during loading of the compiled shared library 206.

This process results in a modified shared library 308 containing the added code segments 310a, 310b, 310c associated with the application 302. This modification of the compiled shared library 206 enables the application 302 to utilize the added code in the code segments 310a, 310b, 310c during run time. The modified shared library 308 may also contain other code sites and code segments for other applications authorized to dynamically modify the compiled shared library 206. Thus, the library modification manager 114 may allow various applications that utilize the compiled shared library 206 to insert code segments specific to that application and also specific to particular use cases (e.g., debugging, function tracing, etc.). This capability allows applications to independently and dynamically modify the compiled shared library 206 during run time.

The library modification manager 114 may be configured to record and track the memory pages of the modified shared library 308 that contain code segments. The library modification manager 114 may be configured to remove the code segments 310a, 310b, 310c from the modified shared library 308 when it is unloaded from memory. This allows the compiled shared library 206 to be loaded with different code segments the next time the compiled shared library 206 is loaded into memory. For example, a different set of applications may utilize the compiled shared library 206 the next time the library is loaded, or the same application may utilize the compiled shared library 206 in a different use context (e.g., debugging vs. function tracing).

Figure 4A:
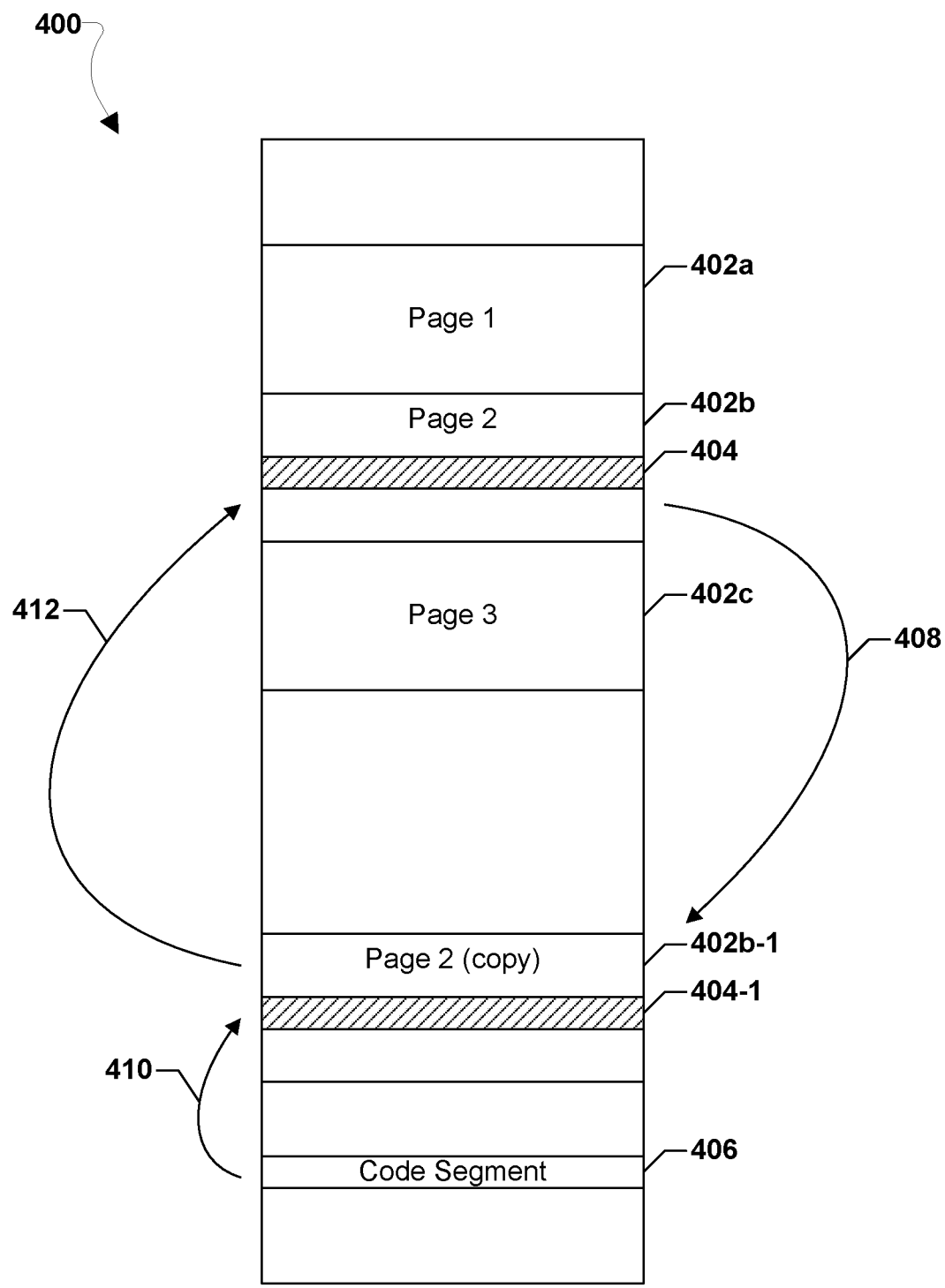
FIGS. 4A-4C are block diagrams illustrating dynamic insertion of a code segment into a code site in a compiled shared library according to various embodiments.
Figure 4B:
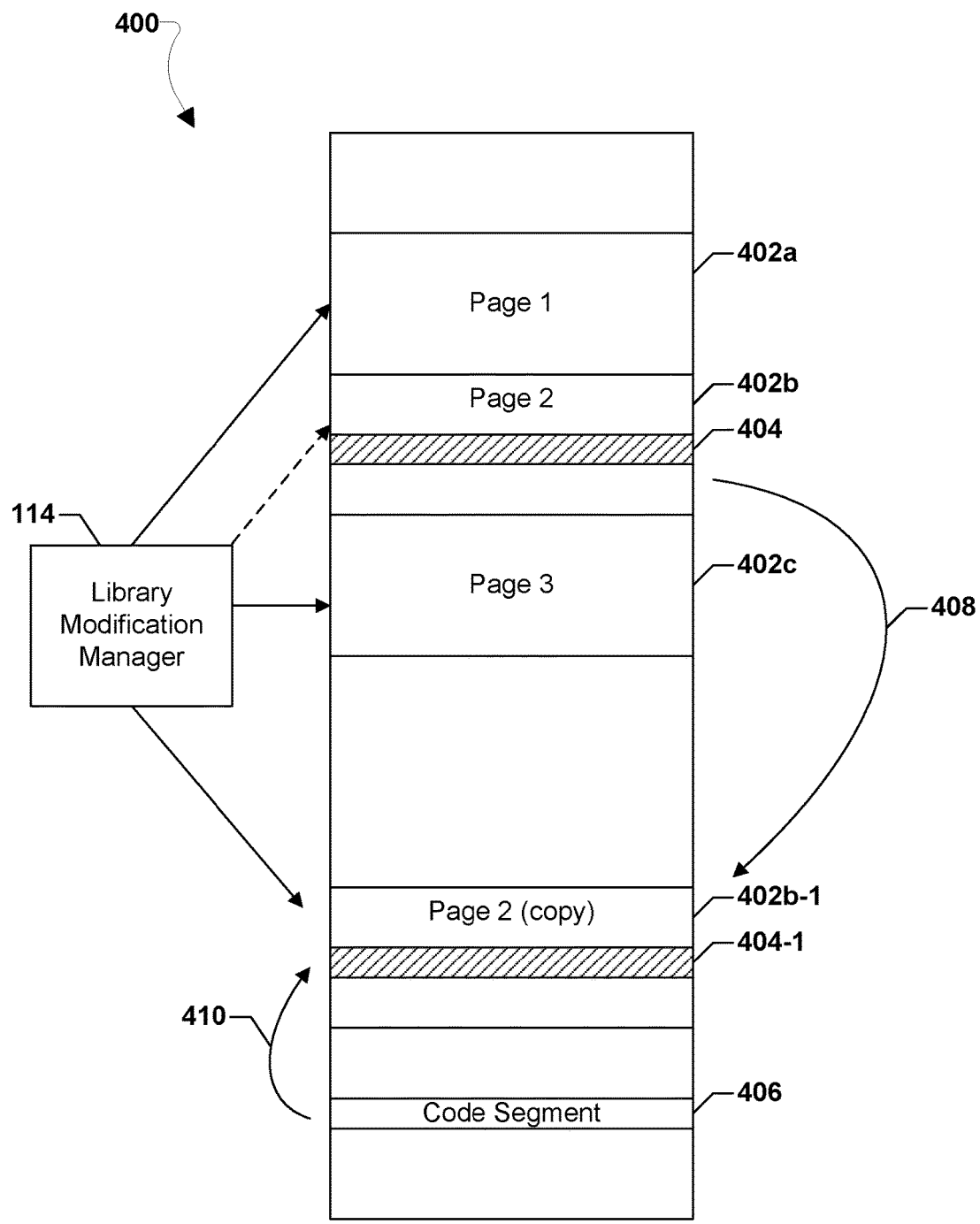
Figure 4C:
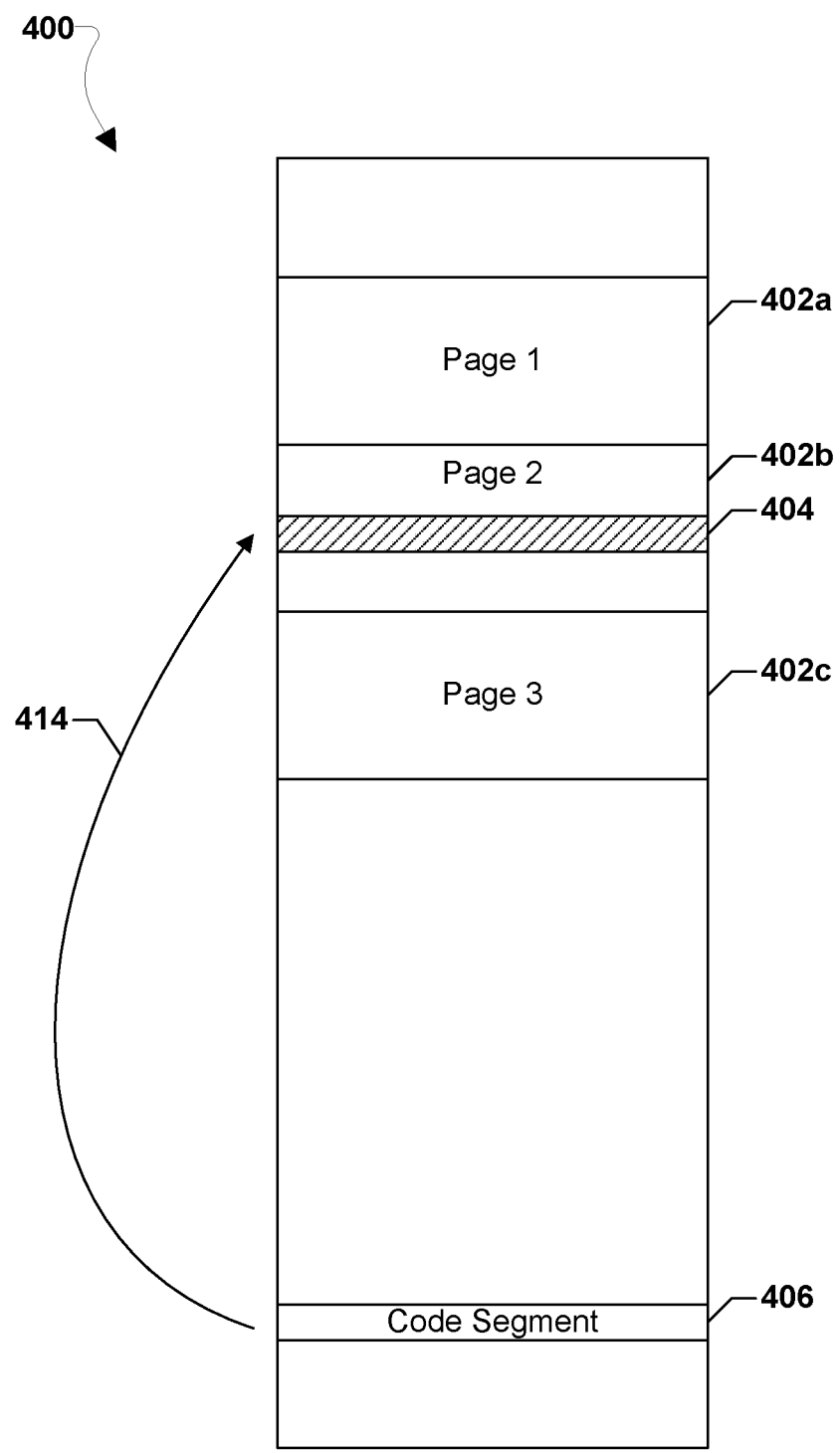

The library modification manager 114 may insert code segments into particular code sites of a compiled shared library by various methods. FIGS. 4A-4C illustrate some non-limiting examples of how code segments may be dynamically inserted into a compiled shared library at run time. FIG. 4A includes a process address space 400 that may store a compiled shared library. The compiled shared library may be mapped into the process address space 400 as a number of memory pages, for example as memory pages 402a, 402b, 402c. A code site 404 may have been inserted into the memory page 402b by a compiler (e.g., the compiler 162) of a library developer computing device during compilation. The code site 404 may include one or more dummy instructions (e.g., NOP instructions) inserted by the compiler.

When the compiled shared library is loaded into memory, the library modification manager 114 may identify all code sites in the compiled shared library and their corresponding code segments (e.g., from sets of code sites and code segments associated with applications that are registered with the library modification manager 114). For example, the library modification manager 114 may identify the code site 404 and its associated code segment 406. The library modification manager 114 may copy the code segment 406 into a separate area of the process address space 400.

The library modification manager 114 may copy the memory page 402b containing the code site 404 into a separate area of the process address space 400 in operation 408, resulting in a copied memory page 402b-1 containing a copied code site 404-1. The library modification manager 114 may then overwrite the dummy instructions in the copied code site 404-1 with the code segment 406 in operation 410. If the copied memory page 402b-1 contains other code sites, the library modification manager 114 may also insert the associated code segments at those code sites. The library modification manager 114 may then overwrite the original memory page 402b with the copied memory page 402b-1 in operation 412. This sequence of operations results in the memory page 402b containing the code segment 406 at the code site 404.

Instead of overwriting the original memory page 402b in operation 412, the library modification manager 114 may map the copied memory page 402b-1 as part of the compiled shared library, as illustrated in FIG. 4B. For example, an application may utilize virtual addresses for addressing the compiled shared library that map to the physical memory pages 402a, 402b, and 402c. After inserting the code segment 406 into the copied memory page 402b-1, the library modification manager 114 may un-map the original memory page 402b from the virtual address utilized by the first application and map the same virtual address to the copied memory page 402b-1. This sequence of operations avoids the second memory page copy in operation 412. Examples of this method of dynamic modification are further described with reference to FIGS. 5A-5B.

Alternatively, both memory page copies in operations 408 and 410 may be avoided by copying the code segment 406 directly into the code site 404 in operation 414, as illustrated in FIG. 4C.

Figure 5A:
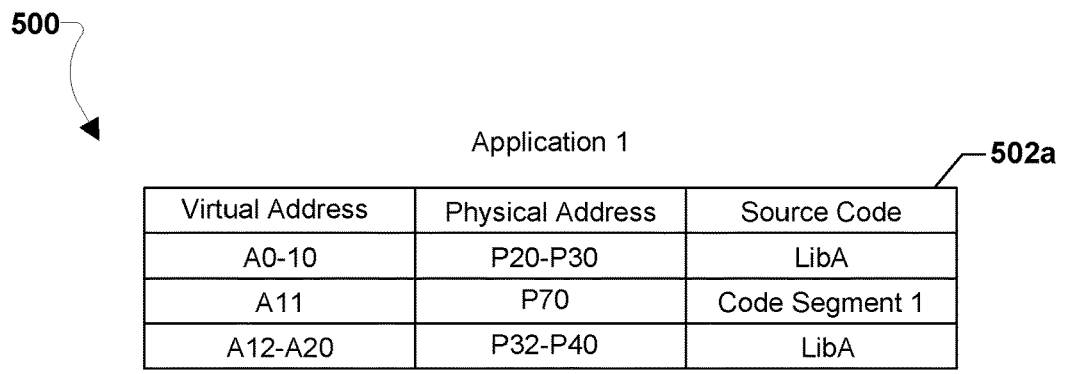
FIGS. 5A-5B are block diagrams illustrating the dynamic modification of a compiled shared library by various applications according to various embodiments.
Figure 5A:
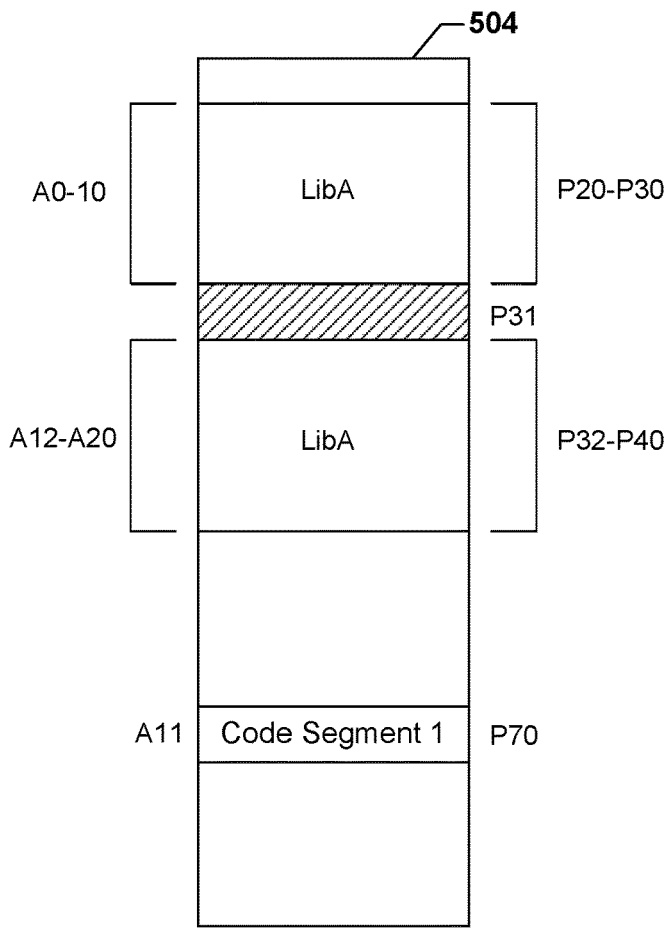
Figure 5B:
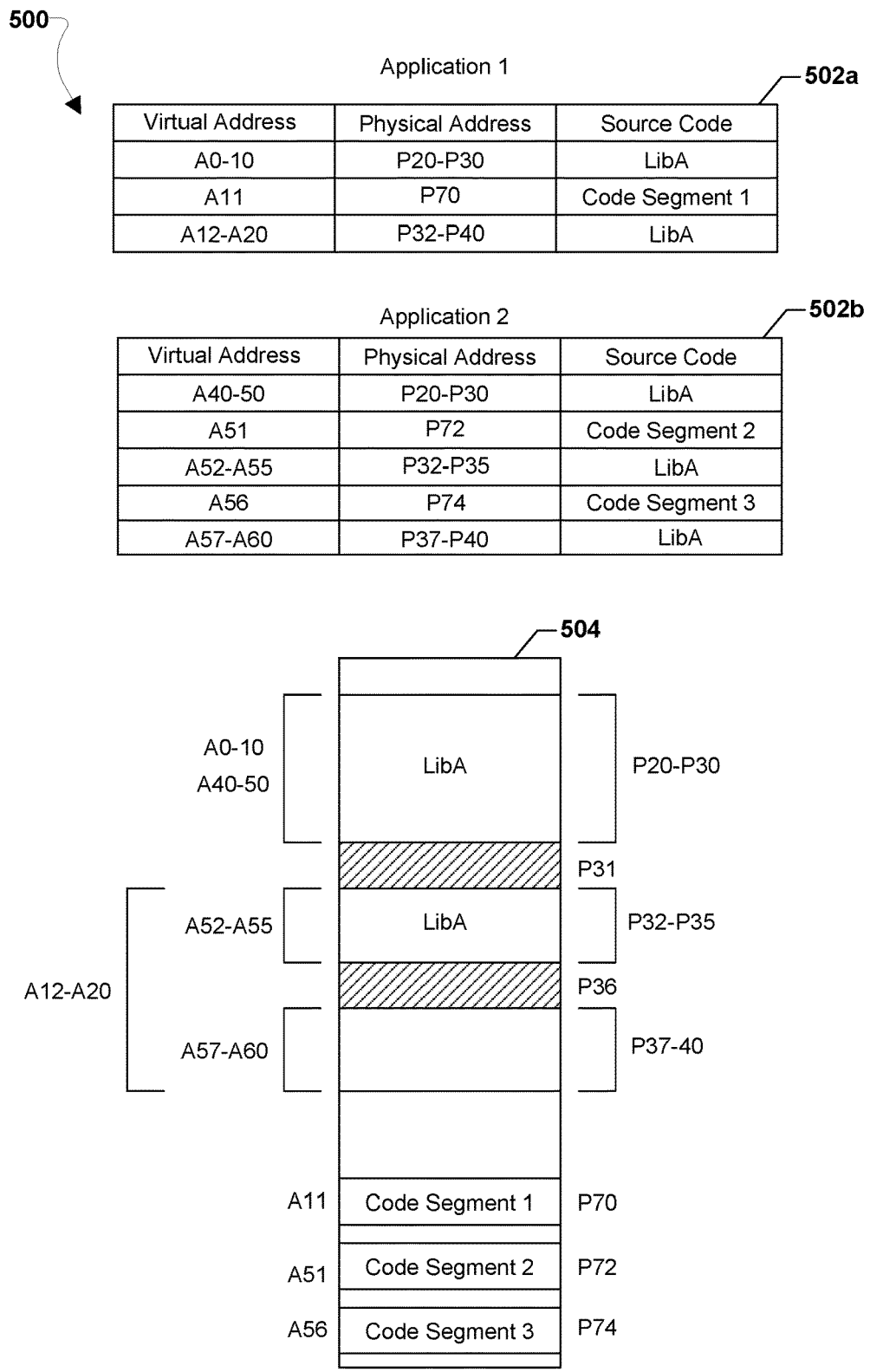

FIGS. 5A-5B show a block diagram 500 illustrating dynamic modification of a compiled shared library by multiple applications according to various embodiments. A first application on a client computing device (e.g., the client computing device 100) may have a mapping 502a of a compiled shared library (named "LibA" in FIGS. 5A-5B) stored on the client computing device. The compiled shared library may have been obtained from a library developer computing device that inserted one or more dummy instructions (e.g., NOP instructions) at particular code sites in the shared library during compilation. The compiled shared library may be stored in a process address space 504 in memory of the client computing device.

The mapping 502a may associate virtual addresses utilized by the first application with physical memory addresses in the process address space 504 and also with the library code segments stored in the physical memory addresses. For example, in the mapping 502a the virtual address range A0-A10 may correspond to the physical address range P20-P30 spanning one or more memory pages where part of the source code for shared library LibA is stored. The shared library LibA may have dummy instructions (e.g., NOP instructions) inserted at a memory page with physical memory address P31. The first application may dynamically modify the compiled shared library to insert a first code segment into the code site at physical memory address P31. This dynamic modification may be accomplished in a number of ways as discussed with reference to FIGS. 4A-4C. For example, the library modification manager of the client computing device may copy the first code segment into a memory page with physical memory address P70 in the process address space 504 when loading the shared library LibA into the process address space 504. The library modification manager may then map the virtual address A11 of the first application to the physical memory address P70 instead of P31 (i.e., a modification similar to that illustrated in FIG. 4B).

The virtual addresses A12-20 may be mapped to the original code of the shared library LibA in physical memory addresses P32-P40 spanning one or more memory pages. The resultant mapping 502a may then have a contiguous block of virtual addresses A0-20 that is mapped to non-contiguous blocks of physical addresses P20-P30, P70, and P32-P40 that includes shared library LibA as well as the inserted first code segment.

A second application on the client computing device may also dynamically modify the shared library LibA, as illustrated in FIG. 5B. The second application may have a mapping 502b that associates virtual addresses utilized by the second application with physical memory addresses in the process address space 504 and also with the library code segments stored in the physical memory addresses. For example, in the mapping 502b, the virtual address range A40-A50 may correspond to the physical address range P20-P30 spanning one or more memory pages where part of the source code where for shared library LibA is stored. This same physical address range may be mapped to virtual addresses A0-A10 utilized by the first application.

The shared library LibA may have dummy instructions inserted at a memory page with physical memory address P31. The second application may dynamically modify the compiled shared library to insert a second code segment, different from the first code segment inserted by the first application, into the code site at physical memory address P31. This dynamic modification may be accomplished in a number of ways, as discussed with reference to FIGS. 4A-4C. For example, the library modification manager of the client computing device may copy the second code segment into a memory page with physical memory address P72 in the process address space 504. The library modification manager may then map the virtual address A51 of the second application to the physical memory address P72 instead of P31 (i.e., a modification similar to that illustrated in FIG. 4B). Thus, the same code site at physical address P31 may be mapped to two different code segments (i.e., the first and second code segments) utilized by two different applications.

The virtual addresses A52-55 utilized by the second application may be mapped to the original code of the shared library LibA in physical memory addresses P32-P35 spanning one or more memory pages. The shared library LibA may have another set of dummy instructions inserted at a memory page with the physical memory address P36. The second application may dynamically modify the compiled shared library to insert a third code segment into the code site at physical memory address P36. For example, the library modification manager of the client computing device may copy the third code segment into a memory page with physical memory address P74 in the process address space 504. The library modification manager may then map the virtual address A56 of the second application to the physical memory address P74 instead of P36.

The virtual addresses A57-A60 utilized by the second application may be mapped to the original code of the shared library LibA in physical memory addresses P37-P40 spanning one or more memory pages. The resultant mapping 502b may then have a contiguous block of virtual addresses A40-60 that is mapped to non-contiguous blocks of physical addresses P20-P30, P72, P-32-P35, P74, and P37-P40 that includes shared library LibA as well as the inserted second and third code segments. At the same time, the first application may keep its separate mapping 502a. Thus, both applications may concurrently modify the shared library LibA by inserting different code segments at the same or different code sites.

Figure 6:
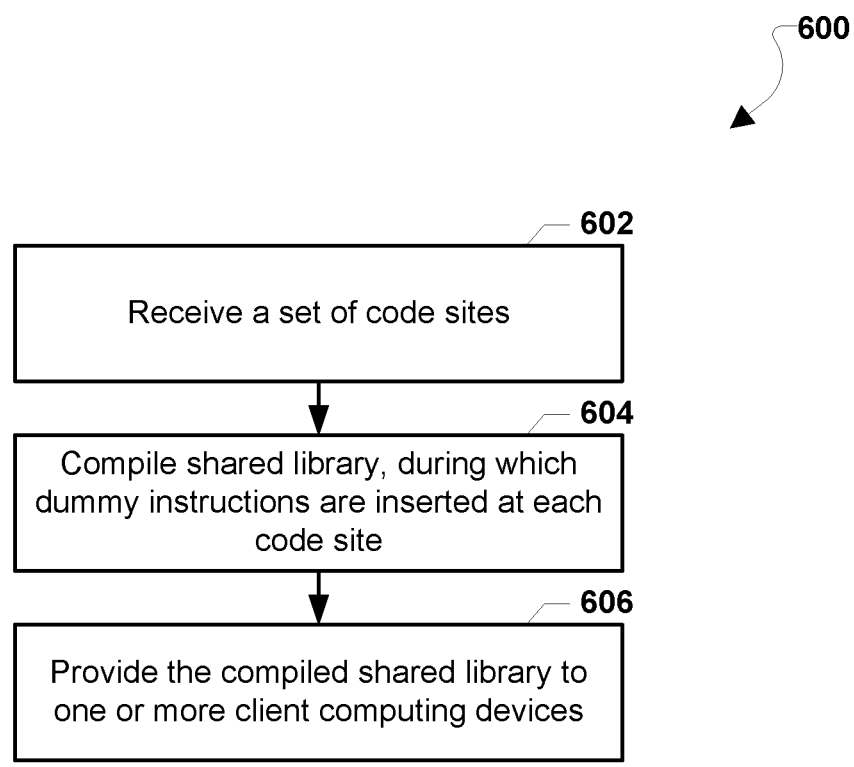
FIG. 6 is a process flow diagram illustrating a method for compiling shared libraries on a computing device according to various embodiments.

FIG. 6 illustrates a method 600 for compiling libraries on a computing device according to various embodiments. With reference to FIGS. 1-6, the method 600 may be implemented with a processor (e.g., the processor 152 or the like) of a library developer computing device (such as the library developer computing device 150) having a compiler (e.g., the compiler 162). The library developer computing device may be utilized, for example, by a library developer to create and compile one or more shared libraries that are then provided to client computing devices.

In block 602, the processor may receive a set of code sites associated with a shared library stored on the library developer computing device. The set of code sites may include memory addresses within the associated shared library where additional code segments may be inserted by various applications on client computing devices during run time. The set of code sites may be stored in memory on the library developer computing device.

In block 604, the processor may cause a compiler of the library developer computing device to compile the shared library, during which one or more dummy instructions are inserted in the compiled shared library at each code site in the set of code sites. These dummy instructions (e.g., NOP instructions) may later be replaced with additional code segments by various applications executing on client computing devices. The number of dummy instructions inserted at each code site may be constant, and the number may be determined based on various parameters, such as the number of code sites or the maximum size of code segments that may be inserted at the code sites.

In block 606, the processor may provide the compiled shared library to one or more client computing devices. For example, the library developer may transmit the compiled shared library to the client computing devices as part of an installation, download, or software update. In this manner, the method 600 provides a way to compile a shared library with code sites that applications may utilize to dynamically modify the shared library.

Figure 7:
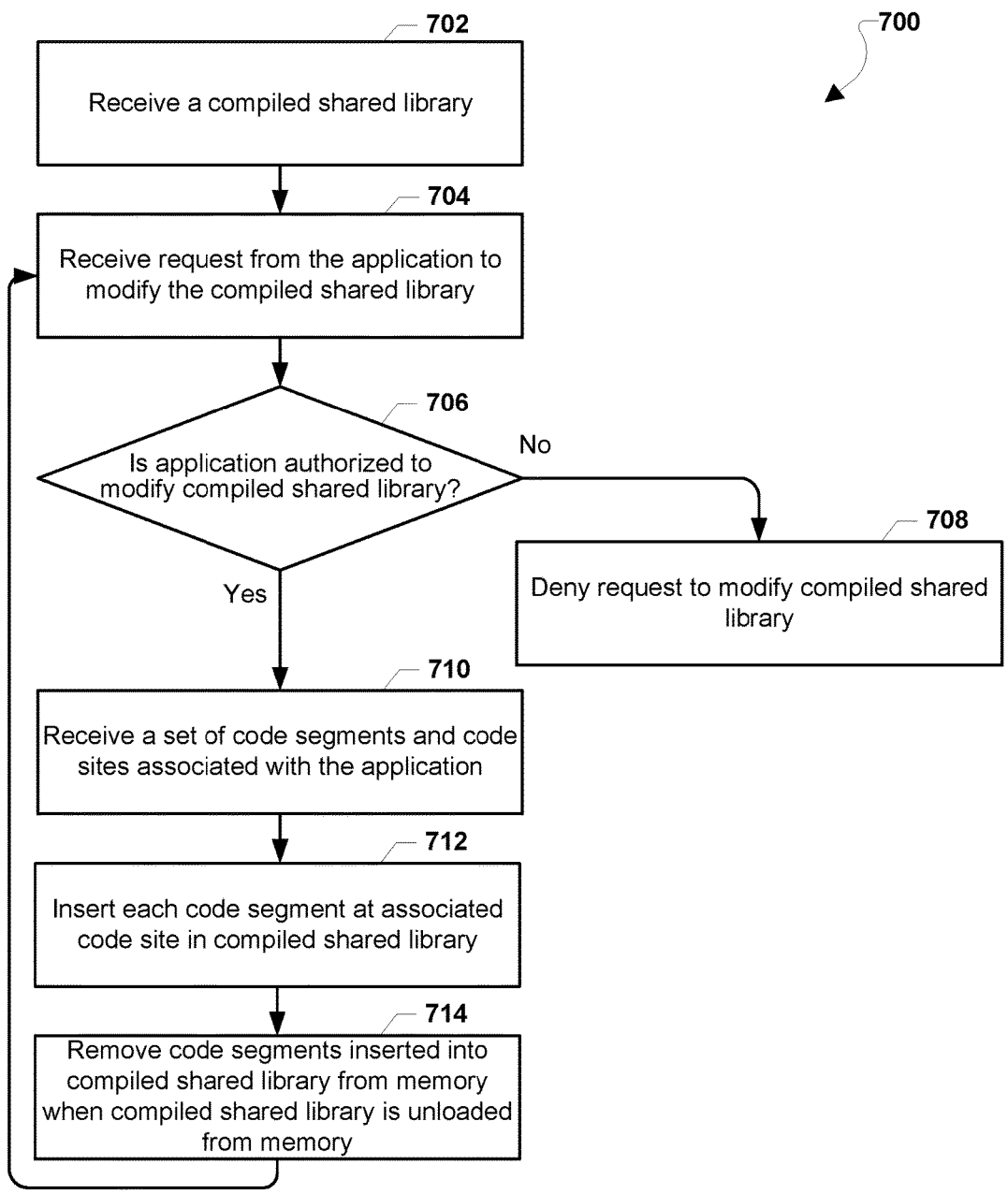
FIG. 7 is a process flow diagram illustrating a method for dynamically modifying shared libraries on a computing device according to various embodiments.

FIG. 7 illustrates a method 700 for dynamically modifying shared libraries on a computing device according to various embodiments. With reference to FIGS. 1-7, the method 700 may be implemented with a processor (e.g., the processor 102 or the like) of a client computing device (such as the client computing device 100) having a library modification manager (e.g., the library modification manager 114).

In block 702, the processor may receive a compiled shared library. The compiled shared library may be received from a library developer computing device that compiled the shared library. The compiled shared library may include one or more code sites at which dummy instructions have been inserted during compilation. These code sites may be replaced by code segments from various applications executing on the client computing device.

In block 704, the processor may receive a request from an application on the client computing device to modify the compiled shared library during run time. The processor may also receive requests from other applications to modify the same or different shared libraries. A library modification manager in the kernel of the client computing device may receive these requests from various applications when the applications are initially loaded into memory and executed.

In determination block 706, the processor may determine whether the application is authorized to modify the compiled shared library. For example, the library modification manager may maintain an access control list with library modification privileges of various applications and processes on the computing device. The processor may cause the library modification manager to determine whether the requesting application is authorized to modify the requested compiled shared library, and may also determine whether the request originates from a known and privileged code path (e.g., request comes only from trusted code).

In response to determining that the application is not authorized to modify the shared library (i.e., determination block 706="No"), the processor may deny the request to modify the compiled shared library in block 708.

In response to determining that the application is authorized to modify the compiled shared library (i.e., determination block 706="Yes"), the processor may receive a set of code segments and a set of code sites associated with the application in block 710. Each code site in the set of code sites may include memory address locations in the compiled shared library where one or more dummy instructions have been inserted. Each code segment in the set of code segments may be a segment of code to be inserted at an associated code site of the compiled shared library. The processor may also receive other code sites and code segments associated with other applications that are authorized to modify the compiled shared library. The application may have registered the set of code segments and set of code sites with the library modification manager beforehand.

In block 712, the processor may insert each code segment in the set of code segments at its associated code site in the compiled shared library. The code segments may be inserted when the compiled shared library is loaded into memory (e.g., at run time), or may be inserted at other times (e.g., before run time). For example, the processor may cause the library modification manager in the kernel to insert the code segments into the compiled shared library while loading the compiled library into executable memory. If the processor receives multiple sets of code segments from multiple applications, the processor may insert each code segment of all the sets of code segments into its associated code site in memory. Methods 800 and 900 for inserting the code segments at particular code sites are discussed in further detail with reference to FIGS. 8 and 9.

In block 714, the processor may remove the code segments inserted into the compiled shared library from memory when the compiled shared library is unloaded from memory. In addition, the processor may un-map any additional memory pages created by the library modification manager when loading the compiled shared library into memory. This allows the processor to insert new code segments into the compiled shared library the next time the compiled shared library is loaded into memory. For example, at a later time the processor may receive another request from an application to modify the compiled shared library in block 704. In this manner, the method 700 provides a way for applications to independently and dynamically modify a compiled shared library.

Figure 8:
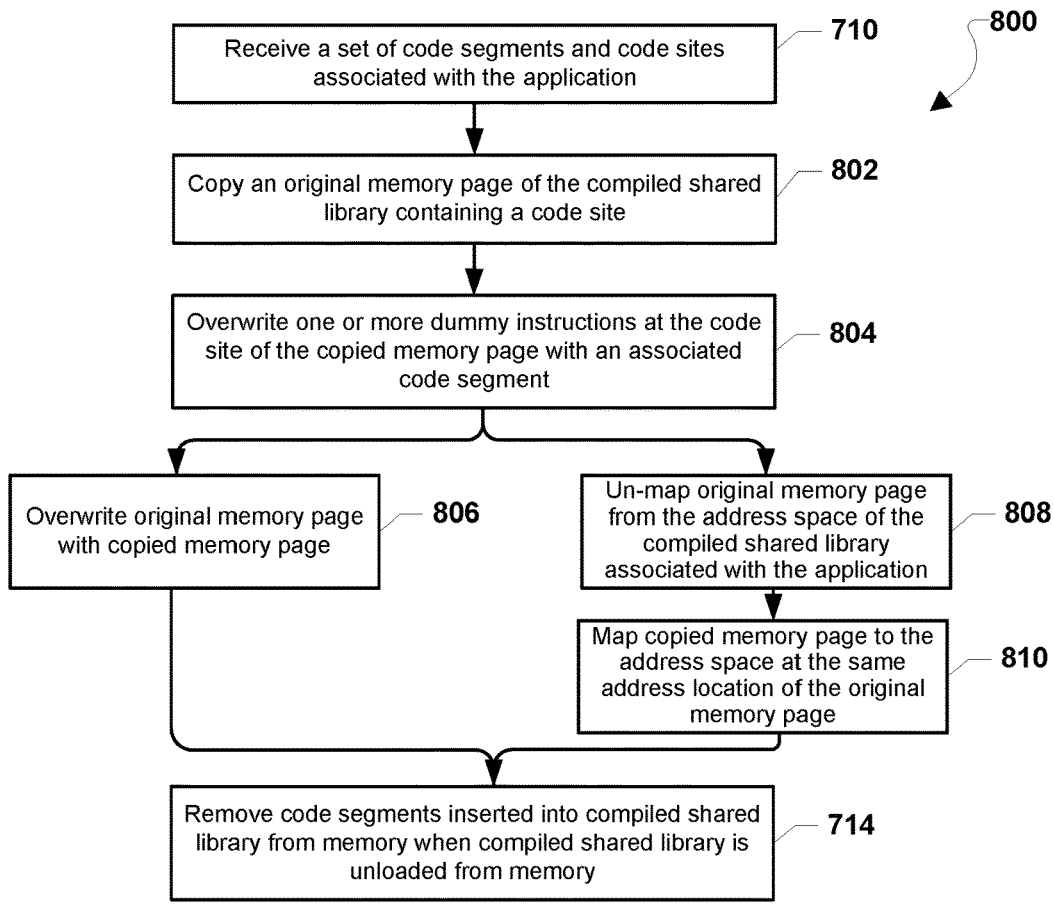
FIG. 8 is a process flow diagram illustrating a method for dynamically inserting a code segment into a code site in a shared library according to various embodiments.

FIG. 8 illustrates a method 800 for dynamically inserting a code segment into a code site in a compiled shared library according to various embodiments. With reference to FIGS. 1-8, the method 800 includes operations that may be performed in block 712 of the method 700, and may be implemented with a processor (e.g., the processor 102, and/or the like) of a client computing device (such as the client computing device 100) having a library modification manager (e.g., the library modification manager 114).

After the processor receives a set of code sites and a set of code segments associated with the application in block 710, the processor may copy an original memory page of the compiled shared library containing one or more code sites in block 802. The compiled shared library may be mapped into multiple memory pages. Each memory page may contain one or more dummy instructions (e.g., NOP instructions) inserted at specific code sites by a library developer computing device.

In block 804, the processor may overwrite the one or more dummy instructions inserted at the code site of the copied memory page with an associated code segment. For example, a copy of the code segment may be stored in memory and the code segment may be copied into the code site, overwriting the dummy instructions. If the copied memory page includes multiple code sites, all associated code segments may be copied into the copied memory page.

In block 806, the processor may overwrite the original memory page with the copied memory page containing the code segment. Alternatively, in block 808, the processor may un-map the original memory page from the address space of the compiled shared library associated with the application. In block 810, the processor may map the copied memory page containing the code segment into the address space at the same address location of the original memory page. For example, the application may map a virtual address to the physical address of the original memory page. The processor may re-map the virtual address to the physical address of the copied memory page. The processor may then remove the code segments inserted into the compiled shared library from memory when the compiled shared library is unloaded from memory in block 714 of the method 700 as described.

Figure 9:
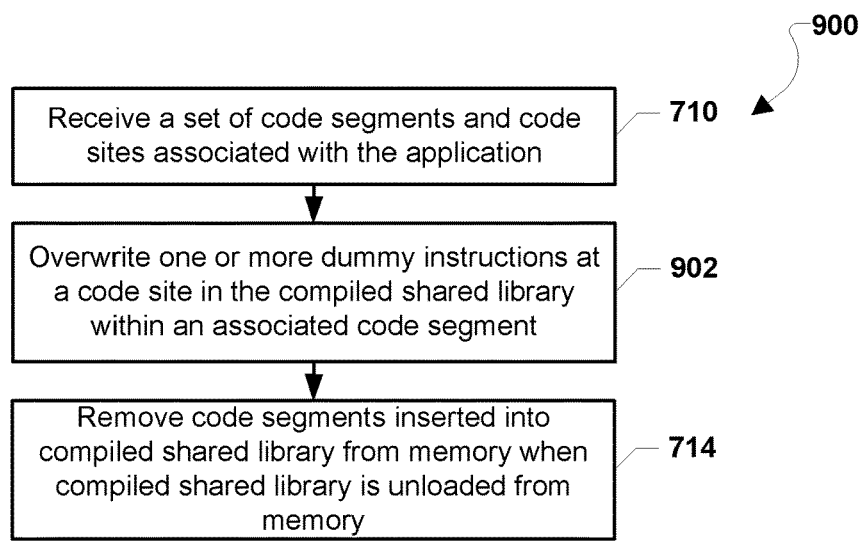
FIG. 9 is a process flow diagram illustrating a method for dynamically inserting a code segment into a code site in a shared library according to various embodiments.

FIG. 9 illustrates a method 900 for dynamically inserting a code segment into a code site in a compiled shared library according to various embodiments. With reference to FIGS. 1-9, the method 900 includes operations that may be performed in block 712 of the method 700, and may be implemented with a processor (e.g., the processor 102, and/or the like) of a client computing device (such as the client computing device 100) having a library modification manager (e.g., the library modification manager 114).

After the processor receives a set of code sites and a set of code segments associated with the application in block 710, the processor may overwrite one or more dummy instructions at a code site in the compiled shared library with an associated code segment in block 902. For example, a copy of the code segment may be stored in memory and the code segment may be copied into a memory page of the compiled shared library containing the code site. This process may be repeated for each code site in the compiled shared library. The processor may then remove the code segments inserted into the compiled shared library from memory when the compiled shared library is unloaded from memory in block 714 of the method 700 as described.

Figure 10:
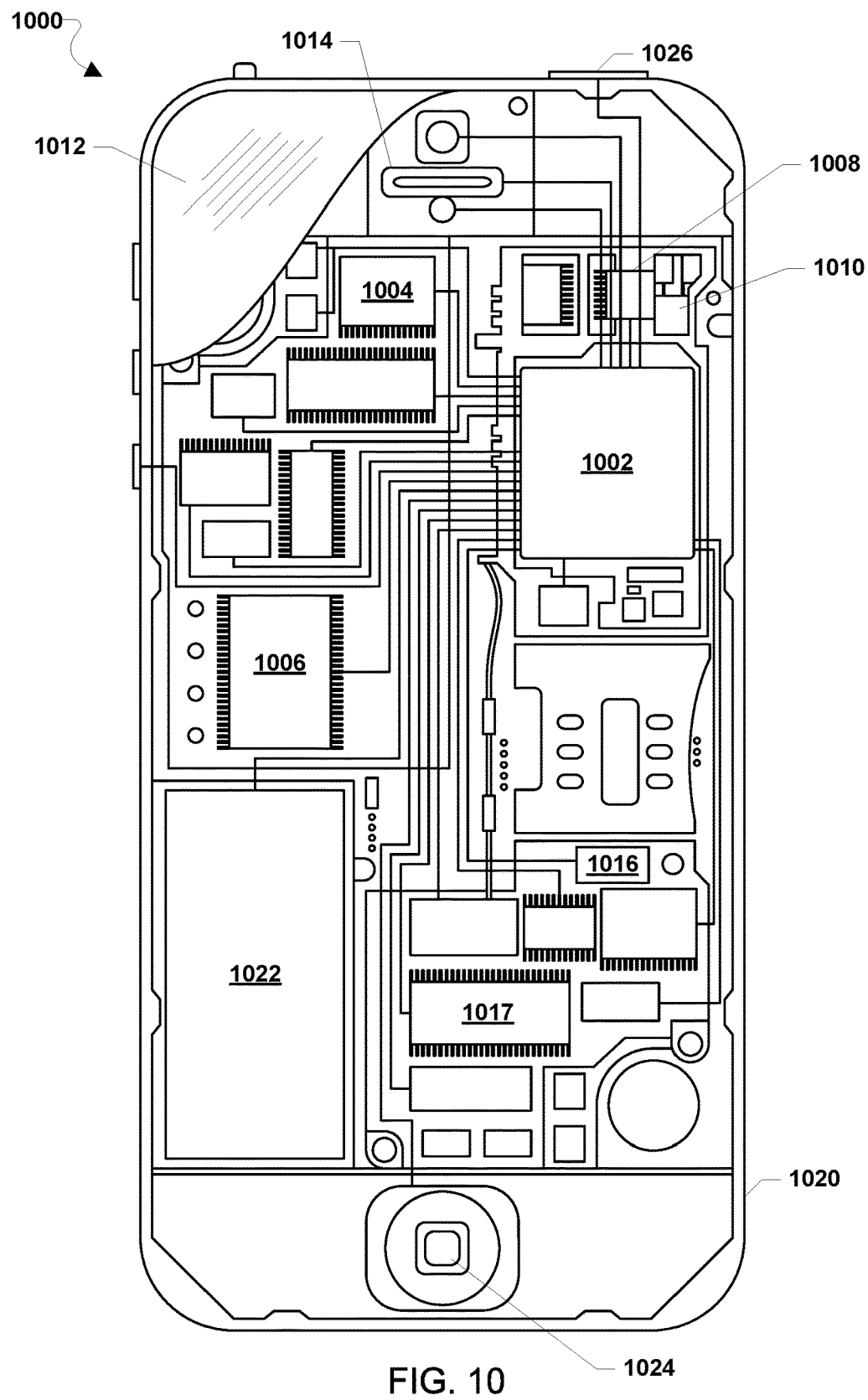
FIG. 10 is a component block diagram of a client computing device suitable for implementing some embodiment methods.

Various embodiments may be implemented in any of a variety of client computing devices, an example of which (e.g., computing device 1000) is illustrated in FIG. 10. According to various embodiments, the computing device 1000 may be similar to the client computing device 100 as described with reference to FIG. 1A. As such, the computing device 1000 may implement the methods 700, 800, and 900.

The computing device 1000 may include a processor 1002 coupled to a touchscreen controller 1004 and an internal memory 1006. The processor 1002 may be one or more multi-core integrated circuits designated for general or specific processing tasks. The internal memory 1006 may be volatile or non-volatile memory, and may also be secure and/or encrypted memory, or unsecure and/or unencrypted memory, or any combination thereof. The touchscreen controller 1004 and the processor 1002 may also be coupled to a touchscreen panel 1012, such as a resistive-sensing touchscreen, capacitive-sensing touchscreen, infrared sensing touchscreen, etc. Additionally, the display of the computing device 1000 need not have touch screen capability.

The computing device 1000 may have a cellular network transceiver 1008 coupled to the processor 1002 and to an antenna 1010 and configured for sending and receiving cellular communications. The transceiver 1008 and the antenna 1010 may be used with the above-mentioned circuitry to implement various embodiment methods. The computing device 1000 may include one or more SIM cards 1016 coupled to the transceiver 1008 and/or the processor 1002 and may be configured as described herein. The computing device 1000 may include a cellular network wireless modem chip 1017 that enables communication via a cellular network and may be coupled to the processor.

The computing device 1000 may also include speakers 1014 for providing audio outputs. The computing device 1000 may also include a housing 1020, constructed of a plastic, metal, or a combination of materials, for containing all or some of the components discussed herein. The computing device 1000 may include a power source 1022 coupled to the processor 1002, such as a disposable or rechargeable battery. The rechargeable battery may also be coupled to the peripheral device connection port to receive a charging current from a source external to the computing device 1000. The computing device 1000 may also include a physical button 1024 for receiving user inputs. The computing device 1000 may also include a power button 1026 for turning the computing device 1000 on and off.

Figure 11:
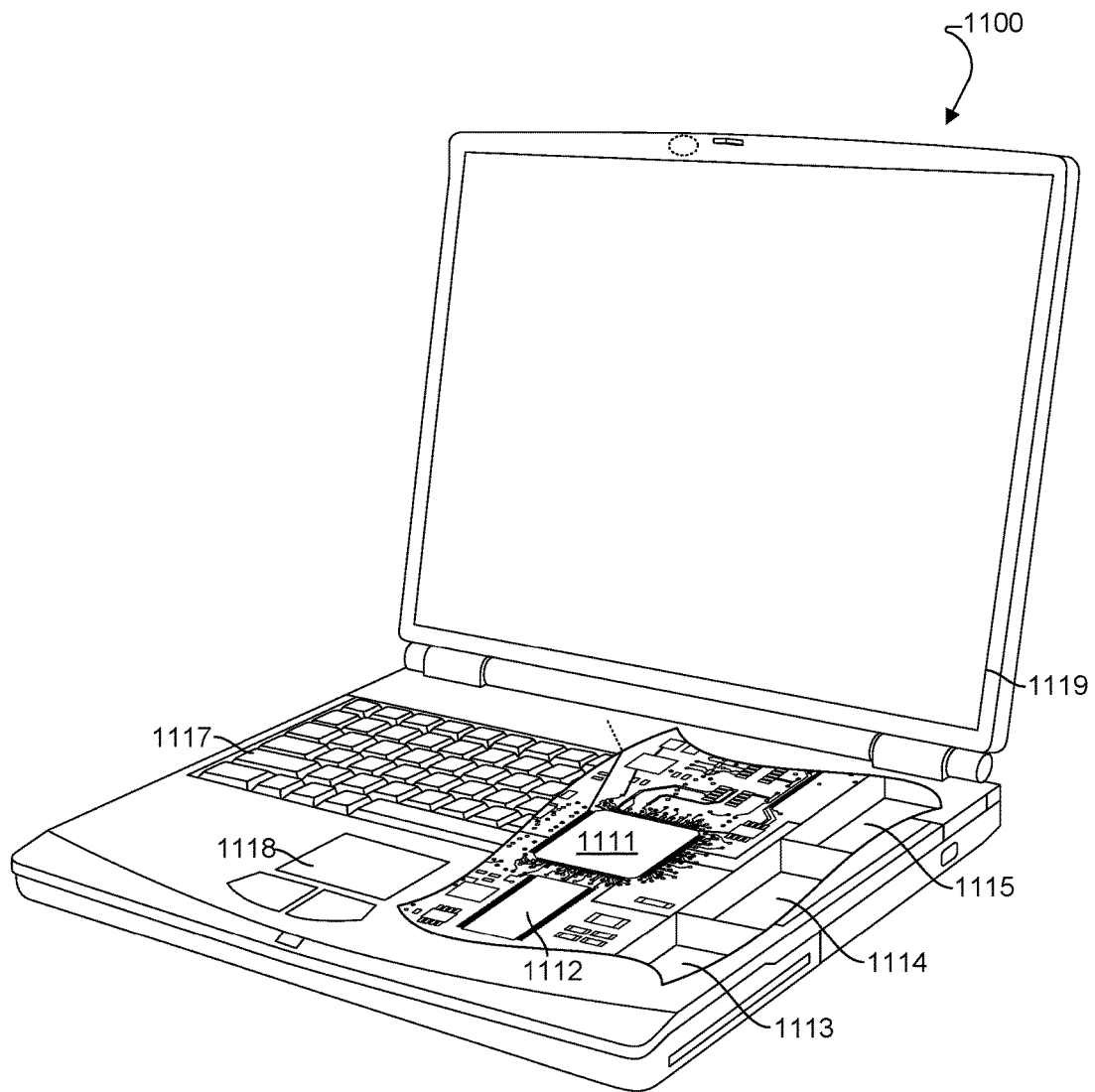
FIG. 11 is a component block diagram of a library developer computing device suitable for implementing some embodiment methods.

Various embodiments may also be implemented in any of a variety of library developer computing devices, an example of which (e.g., computing device 1100) is illustrated in FIG. 11. According to various embodiments, the computing device 1100 may be similar to the library developer computing device 150 as described with reference to FIG. 1B. As such, the computing device 1100 may implement the method 600.

The computing device 1100 may include a touchpad 1117 that serves as the pointing device of the computing device 1100, and thus may receive drag, scroll, and flick gestures similar to those implemented on wireless devices equipped with a touch screen display and described below. The computing device 1100 will typically include a processor 1111 coupled to volatile memory 1112 and a large capacity nonvolatile memory, such as a disk drive 1113 of Flash memory. The computing device 1100 may also include a floppy disc drive 1114 and a compact disc (CD) drive 1115 coupled to the processor 1111. The computing device 1100 may also include a number of connector ports coupled to the processor 1111 for establishing data connections or receiving external memory devices, such as a universal serial bus (USB) or FireWire® connector sockets, or other network connection circuits for coupling the processor 1111 to a network. In a notebook configuration, the device housing includes the touchpad 1117, the keyboard 1118, and the display 1119 all coupled to the processor 1111. Other configurations of the computing device 1100 may include a computer mouse or trackball coupled to the processor (e.g., via a USB input) as are well known, which may also be used in conjunction with various embodiments.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, units, circuits, and algorithm operations described in connection with the embodiments disclosed herein may be implemented as electronic hardware, computer software, or combinations of both. To clearly illustrate this interchangeability of hardware and software, various illustrative components, blocks, units, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, units, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software unit that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include random access memory (RAM), read only memory (ROM), electrically erasable programmable read only memory (EEPROM), FLASH memory, compact disc read only memory (CD-ROM) or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of various embodiments is provided to enable any person skilled in the art to make or use the claims. Various modifications to these embodiments will be readily apparent to those skilled in the art, and the generic principles defined herein may be applied to some embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for dynamically modifying shared libraries on a client computing device, comprising:
   receiving a first set of code segments and a first set of code sites associated with a first application, wherein:
      the first application is configured, prior to inserting the first set of code segments into a compiled shared library stored on the client computing device, to utilize a virtual address for each code segment in the first set of code segments from the compiled shared library;
      each code site in the first set of code sites comprises an address within the compiled shared library;
      the compiled shared library includes one or more dummy instructions inserted at each code site in the first set of code sites; and
      each code segment in the first set of code segments is associated with a code site in the first set of code sites;
   inserting each code segment in the first set of code segments at its associated code site in the compiled shared library; and
   executing the first application using at least one of the inserted code segments from the compiled shared library.

2. The method of claim 1, further comprising:
   receiving a request to modify the compiled shared library from the first application;
   determining whether the first application is authorized to modify the compiled shared library; and
   denying the request to modify the compiled shared library in response to determining that the first application is not authorized to modify the compiled shared library.

3. The method of claim 1, wherein inserting each code segment at its associated code site in the compiled shared library comprises:
   copying an original memory page of the compiled shared library containing a first code site in the first set of code sites;
   overwriting the one or more dummy instructions at the first code site of the copied memory page with an associated code segment; and
   overwriting the original memory page with the copied memory page.

4. The method of claim 1, wherein inserting each code segment at its associated code site in the compiled shared library comprises:
   copying an original memory page of the compiled shared library containing a first code site in the first set of code sites;
   overwriting the one or more dummy instructions at the first code site of the copied memory page with an associated code segment;
   un-mapping the original memory page from an address space of the compiled shared library associated with the first application; and
   mapping the copied memory page into the address space at a same address location as the original memory page.

5. The method of claim 1, wherein inserting each code segment at its associated code site in the compiled shared library comprises:
   overwriting the one or more dummy instructions at a first code site in the first set of code sites in the compiled shared library with an associated code segment.

6. The method of claim 1, further comprising:
   receiving a second set of code segments and a second set of code sites associated with a second application, wherein:
      each code site in the second set of code sites comprises an address within the compiled shared library;
      the compiled shared library includes one or more dummy instructions inserted at each code site in the second set of code sites; and
      each code segment in the second set of code segments is associated with a code site in the second set of code sites; and
   inserting each code segment in the first set of code segments and the second set of code segments at its associated code site in the compiled shared library.

7. The method of claim 1, further comprising:
   removing the first set of code segments inserted into the compiled shared library from memory when the compiled shared library is unloaded from memory.

8. A method for compiling shared libraries on a computing device, comprising:
   receiving a set of code sites prior to compiling a shared library, wherein each code site in the set of code sites comprises an address within the shared library stored on the computing device;
   compiling the shared library, wherein one or more dummy instructions are inserted in the compiled shared library at each code site in the set of code sites; and
   executing an application using an inserted code segment from the compiled shared library, wherein the inserted code segment is inserted into the compiled shared library at a first address of a first dummy instruction of the one or more dummy instructions in the compiled shared library.

9. The method of claim 8, further comprising:
   providing the compiled shared library to one or more client computing devices.

10. A client computing device, comprising:
    a memory storing a compiled shared library; and
    a processor coupled to the memory and configured with processor-executable instructions to:
       receive a first set of code segments and a first set of code sites associated with a first application, wherein:
          the first application is configured, prior to inserting the first set of code segments into the compiled shared library stored on the client computing device, to utilize a virtual address for each code segment in the first set of code segments from the compiled shared library at runtime;

each code site in the first set of code sites comprises an address within the compiled shared library;

the compiled shared library includes one or more dummy instructions inserted at each code site in the first set of code sites; and each code segment in the first set of code segments is associated with a code site in the first set of code sites;

insert each code segment in the first set of code segments at its associated code site in the compiled shared library; and executing the first application using at least one of the inserted code segments from the compiled shared library.

11. The client computing device of claim 10, wherein the processor coupled is further configured with processor-executable instructions to:

receive a request to modify the compiled shared library from the first application;

determine whether the first application is authorized to modify the compiled shared library; and deny the request to modify the compiled shared library in response to determining that the first application is not authorized to modify the compiled shared library.

12. The client computing device of claim 10, wherein the processor is further configured with processor-executable instructions to insert each code segment at its associated code site in the compiled shared library by:

copying an original memory page of the compiled shared library containing a first code site in the first set of code sites;

overwriting the one or more dummy instructions at the first code site of the copied memory page with an associated code segment; and overwriting the original memory page with the copied memory page.

13. The client computing device of claim 10, wherein the processor is further configured with processor-executable instructions to insert each code segment at its associated code site in the compiled shared library by:

copying an original memory page of the compiled shared library containing a first code site in the first set of code sites;

overwriting the one or more dummy instructions at the first code site of the copied memory page with an associated code segment;

un-mapping the original memory page from an address space of the compiled shared library associated with the first application; and mapping the copied memory page into the address space at a same address location as the original memory page.

14. The client computing device of claim 10, wherein the processor is further configured with processor-executable instructions to insert each code segment at its associated code site in the compiled shared library by:

overwriting the one or more dummy instructions at a first code site in the first set of code sites in the compiled shared library with an associated code segment.

15. The client computing device of claim 10, wherein the processor coupled is further configured with processor-executable instructions to:

receive a second set of code segments and a second set of code sites associated with a second application, wherein:

each code site in the second set of code sites comprises an address within the compiled shared library;

the compiled shared library includes one or more dummy instructions inserted at each code site in the second set of code sites; and each code segment in the second set of code segments is associated with a code site in the second set of code sites; and insert each code segment in the first set of code segments and the second set of code segments at its associated code site in the compiled shared library.

16. The client computing device of claim 10, wherein the processor coupled is further configured with processor-executable instructions to:

remove the first set of code segments inserted into the compiled shared library from memory when the compiled shared library is unloaded from memory.

17. A computing device, comprising:

a memory storing a shared library; and a processor coupled to the memory and configured with processor-executable instructions to:

receive a set of code sites prior to compiling the shared library, wherein each code site in the set of code sites comprises an address within the shared library;

compile the shared library, wherein one or more dummy instructions are inserted in the compiled shared library at each code site in the set of code sites; and executing an application using an inserted code segment from the compiled shared library, wherein the inserted code segment is inserted into the compiled shared library at a first address of a first dummy instruction of the one or more dummy instructions in the compiled shared library.

18. The computing device of claim 17, wherein the processor is further configured with processor-executable instructions to:

provide the compiled shared library to one or more client computing devices.

* * * * *